United States Patent
Drummond et al.

(10) Patent No.: US 11,818,250 B2
(45) Date of Patent: *Nov. 14, 2023

(54) ENCRYPTION KEY MANAGEMENT FOR CHANNELS WITH MULTIPLE ORGANIZATIONS

(71) Applicant: Salesforce, Inc., San Francisco, CA (US)

(72) Inventors: Audrei Drummond, Oakland, WA (US); Michael Demmer, San Francisco, CA (US); Sri Vasamsetti, San Francisco, CA (US); Elizabeth Clemenson, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,184

(22) Filed: Nov. 22, 2021

(65) Prior Publication Data

US 2022/0158830 A1    May 19, 2022

Related U.S. Application Data

(63) Continuation of application No. 17/008,931, filed on Sep. 1, 2020, now Pat. No. 11,184,159.

(51) Int. Cl.
*H04L 9/08* (2006.01)
*H04L 9/14* (2006.01)
*H04L 9/40* (2022.01)

(52) U.S. Cl.
CPC .......... *H04L 9/0827* (2013.01); *H04L 9/083* (2013.01); *H04L 9/0891* (2013.01); *H04L 9/14* (2013.01); *H04L 63/0428* (2013.01)

(58) Field of Classification Search
CPC ..... H04L 9/0827; H04L 9/083; H04L 9/0891; H04L 9/14; H04L 63/0428
See application file for complete search history.

(56) References Cited

U.S. PATENT DOCUMENTS

| | | | |
|---|---|---|---|
| 8,180,051 B1 * | 5/2012 | O'Toole, Jr. | G06F 21/556 380/255 |
| 9,368,964 B2 * | 6/2016 | Adest | H02J 3/381 |

(Continued)

FOREIGN PATENT DOCUMENTS

| | | |
|---|---|---|
| AU | 2020104253 A4 | 3/2021 |
| JP | 2015049542 A | 3/2015 |
| WO | WO2014204862 A1 | 12/2014 |

OTHER PUBLICATIONS

Australian Patent No. 2020104253, Examination Report dated May 6, 2021.

(Continued)

*Primary Examiner* — Yonas A Bayou
(74) *Attorney, Agent, or Firm* — Lee & Hayes, P.C.

(57) ABSTRACT

Media, system, and method for providing encryption key management to a channel within a group-based communication system. The contents of the channel is encrypted according to the encryption key management policy of the organization to which the author of the content belongs and is stored in a data store. Responsive to a revocation request from a first organization, the encryption keys associated with any content in the channel submitted by the authors of said first organization may be revoked from a second organization, such that users of the second organization no longer have access to the content.

20 Claims, 11 Drawing Sheets

(56) References Cited

U.S. PATENT DOCUMENTS

| | | | | |
|---|---|---|---|---|
| 2012/0084286 | A1* | 4/2012 | Hubner | G06Q 10/1093 |
| | | | | 707/E17.089 |
| 2013/0036100 | A1 | 2/2013 | Nagpal et al. | |
| 2013/0077788 | A1* | 3/2013 | Blanchard | H04B 7/18593 |
| | | | | 380/255 |
| 2014/0129977 | A1* | 5/2014 | Kao | G06Q 10/10 |
| | | | | 715/794 |
| 2014/0149729 | A1* | 5/2014 | Hadley | G09C 1/00 |
| | | | | 713/1 |
| 2014/0351606 | A1 | 11/2014 | Demilo et al. | |
| 2016/0331233 | A1* | 11/2016 | Mensinger | A61B 5/7445 |
| 2016/0359684 | A1 | 12/2016 | Rizqi et al. | |
| 2018/0048464 | A1* | 2/2018 | Lim | H04L 9/0894 |
| 2018/0197144 | A1 | 7/2018 | Frank et al. | |
| 2018/0287982 | A1 | 10/2018 | Draeger et al. | |
| 2019/0200177 | A1* | 6/2019 | Greene | G06Q 10/06 |
| 2019/0205810 | A1* | 7/2019 | Pojar | H04L 51/046 |
| 2019/0222544 | A1* | 7/2019 | Ferrick | H04L 51/046 |
| 2019/0253430 | A1* | 8/2019 | Gamache | G06F 21/6218 |
| 2019/0379534 | A1 | 12/2019 | Crowley et al. | |
| 2021/0136047 | A1* | 5/2021 | Wilson | H04L 63/0435 |

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut us All Some Slack", Readwriteweb, Lexisnexis, https://advance.lexis.com/api/permalink/33dd79e2-90f5-409d-ae27-5a2c7e86bf31/?context=1000516> (dated Aug. 14, 2013, 4:15 PM) 3 pages.

European Application No. 19734545.7, Examination Report dated Apr. 7, 2021.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>(dated Oct. 31, 2014) 3 pages.

Japanese Patent Application No. 2019-225306, Office Action with English Translation, dated Mar. 23, 2021.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

The International Search Report and Written Opinion for PCT Application No. PCT/US21/46886, dated Dec. 2, 2021, 14 pgs.

The International Preliminary Report on Patentability dated Mar. 16, 2023 for PCT Application No. PCT/US2021/046886, 9 pages.

* cited by examiner

ENCRYPTION KEY MANAGEMENT FOR CHANNELS WITH MULTIPLE ORGANIZATIONS

RELATED APPLICATIONS

This application claims priority to and is a continuation of U.S. patent Ser. No. 17/008,931, filed on Sep. 1, 2020, which shares certain subject matter with U.S. Provisional Patent Application No. 62/977,690, filed on Feb. 17, 2020 and entitled "Methods, Apparatuses and Computer Program Products for Managing Organization Connections in a Group-Based Communication System." The above-referenced Provisional Patent Application is hereby incorporated by reference in its entirety.

TECHNICAL FIELD

Embodiments of the invention relate to encryption key management. More specifically, embodiments of the invention relate to encryption key management for channels within a group-based communication system that include multiple organizations.

Some organizations require specific encryption policies for media, such as messages and files, within a group-based communication system; however, encryption key management is limited for channels including multiple organizations within the group-based communication system. Typically, encryption key management is disabled for channels that include more than one organization, such that an organization cannot revoke access to media within the channel.

Another concern for multi-organization channels within group-based communication systems is that organizations may be disconnected from the channel and receive a disconnected read-only copy of the channel containing the data and messages within the channel. Upon disconnection of the channel, it may be difficult for an organization to revoke access to the information within the disconnected channel.

As such, there exists a need for a dynamic encryption key management technique that allows data to be encrypted within channels according to an organization-specific encryption key management policy and allows an organization to revoke access even after a channel has been disconnected.

SUMMARY

Embodiments of the invention solve the above-mentioned problems by providing a system and method for providing encryption key management to a channel within a group-based communication system.

A first embodiment of the invention is directed to one or more non-transitory computer-readable media storing computer-executable instructions that, when executed by a processor, perform a method for providing encryption key management to a channel within a group-based communication system, the method comprising the steps of receiving a first message from a first user belonging to the channel in the group-based communication system, wherein the first user belongs to a first organization, displaying the first message in the channel, wherein displaying the first message in the channel includes encrypting the first message with a first encryption key specific to the first organization according to a first encryption policy of the first organization, and storing the encrypted first message in a data store associated with the channel, receiving a second message from a second user belonging to the channel in the group-based communication system, wherein the second user belongs to a second organization different from the first organization, and displaying the second message in the channel, wherein displaying the second message in the channel includes encrypting the second message with a second encryption key specific to the second organization that is different from the first encryption key according to a second encryption policy of the second organization, and storing the second encrypted message in the data store associated with the channel.

A second embodiment of the invention is directed to a method for providing encryption key management to a channel within a group-based communication system, the method comprising the steps of receiving a first message from a first user belonging to the channel in the group-based communication system, wherein the first user belongs to a first organization, displaying the first message in the channel, wherein displaying the first message in the channel includes encrypting the first message with a first encryption key specific to the first organization according to a first encryption policy of the first organization, and storing the encrypted first message in a data store associated with the channel, receiving a second message from a second user belonging to the channel in the group-based communication system, wherein the second user belongs to a second organization different from the first organization, and displaying the second message in the channel, wherein displaying the second message in the channel includes encrypting the second message with a second encryption key specific to the second organization that is different from the first encryption key according to a second encryption policy of the second organization, and storing the second encrypted message in the data store associated with the channel.

A third embodiment of the invention is directed to a system for providing encryption key management to a channel within a group-based communication system, the system comprising a data store, a key server, and a processor programmed to perform a method for providing encryption key management to a channel within a group-based communication system, the method comprising the steps of receiving a first message from a first user belonging to the channel in the group-based communication system, wherein the first user belongs to a first organization, displaying the first message in the channel, wherein displaying the first message in the channel includes encrypting the first message with a first encryption key, received from the key server, specific to the first organization according to a first encryption policy of the first organization, and storing the encrypted first message in the data store, receiving a second message from a second user belonging to the channel in the group-based communication system, wherein the second user belongs to a second organization different from the first organization, and displaying the second message in the channel, wherein displaying the second message in the channel includes encrypting the second message with a second encryption key that is different from the first encryption key, received from the key server, specific to the second organization according to a second encryption policy of the second organization, and storing the second encrypted message in the data store.

Additional embodiments of the invention are directed to encrypting content within a channel of a group-based communication system according to the organization to which the author of the content belongs to.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 4A:
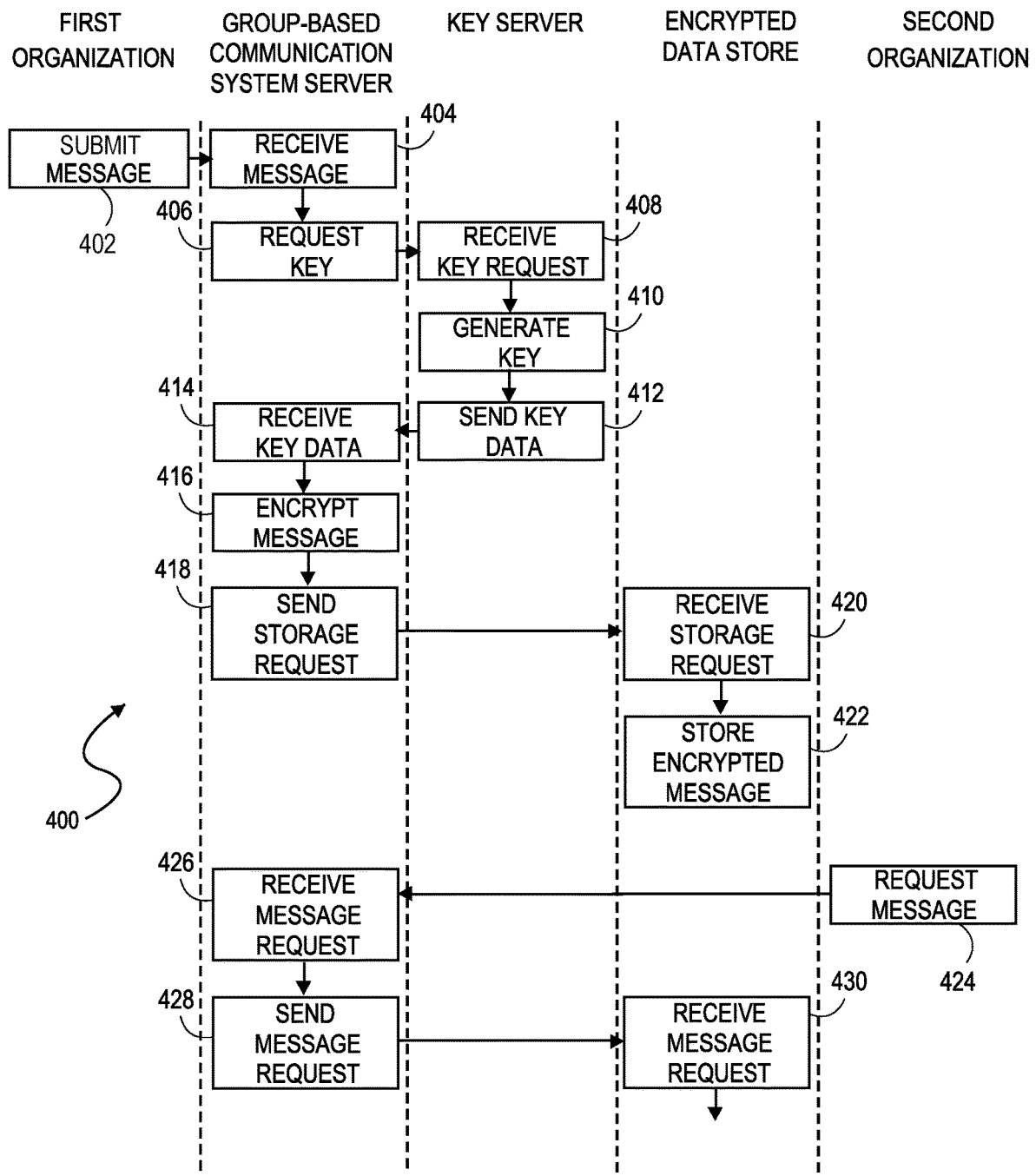
Figure 4B:
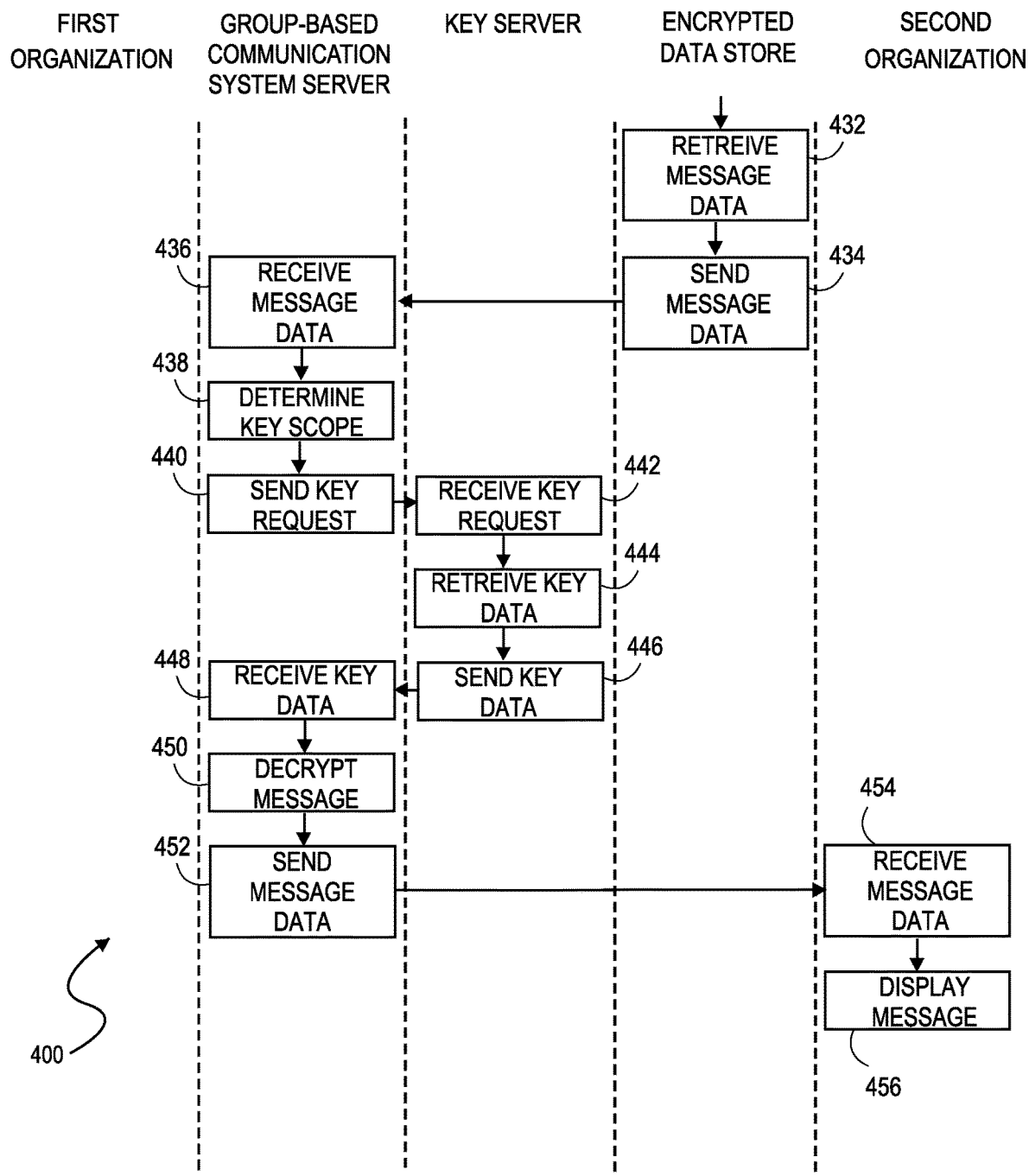
Figure 5A:
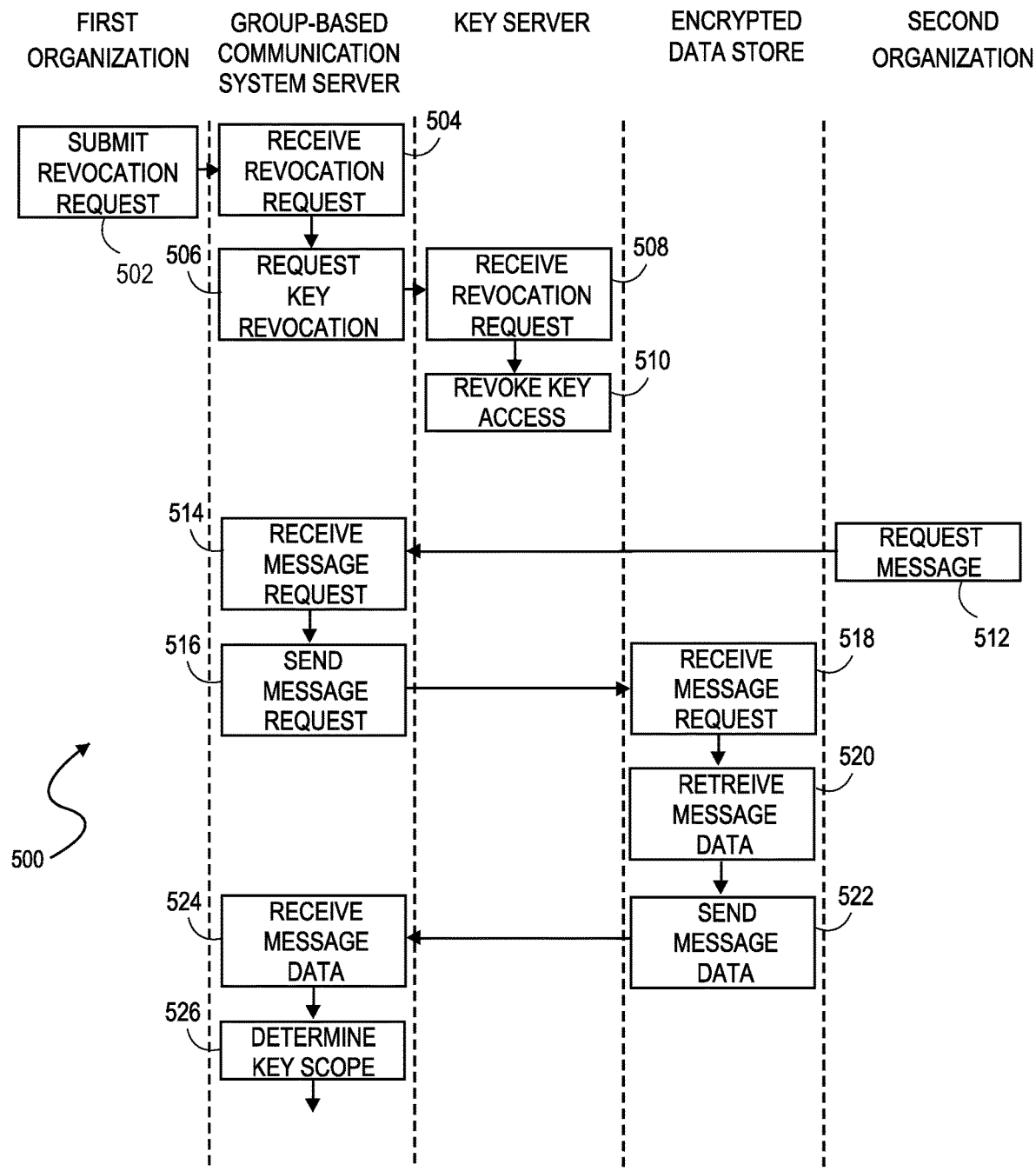
Figure 5B:
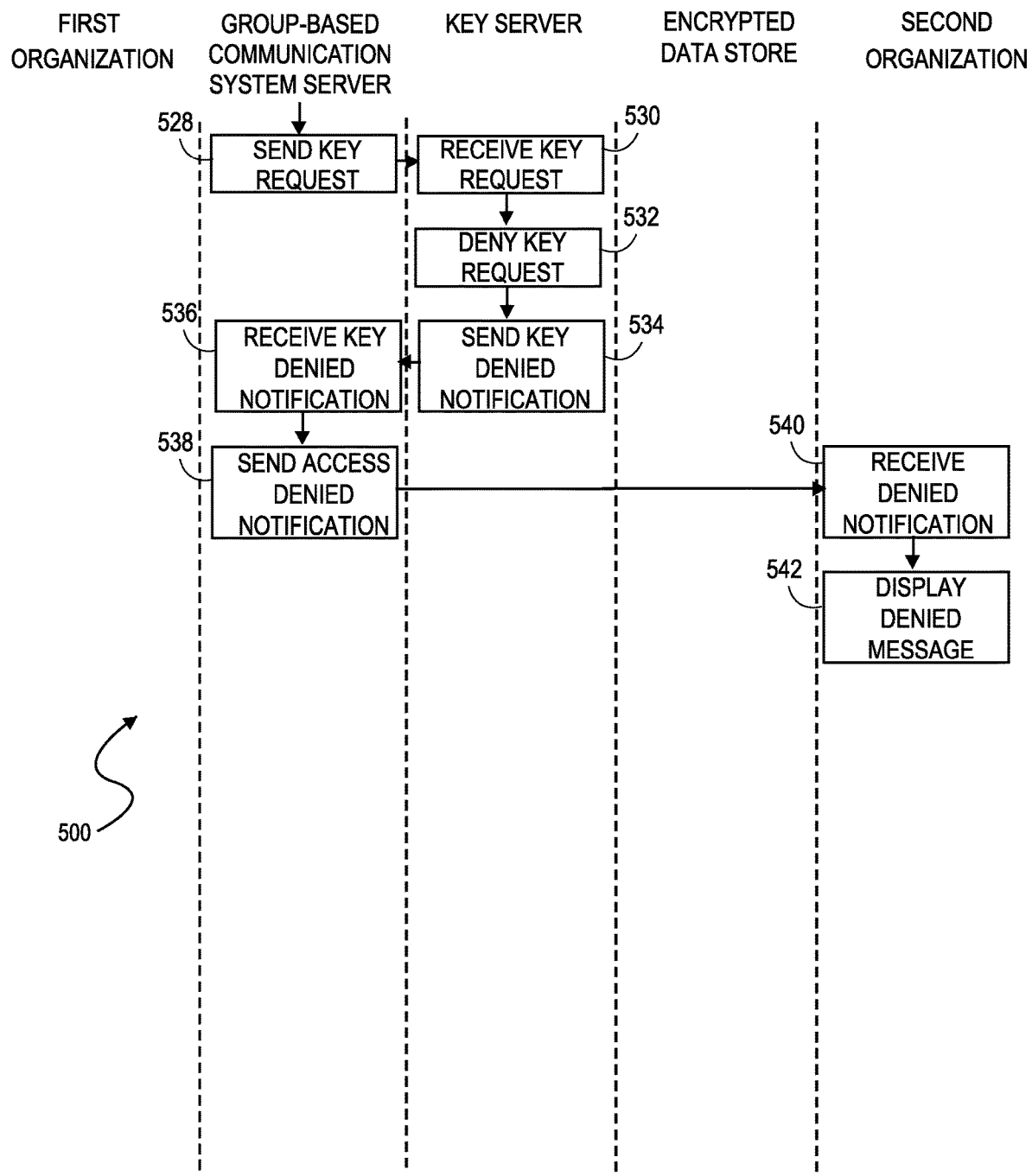
Figure 6:
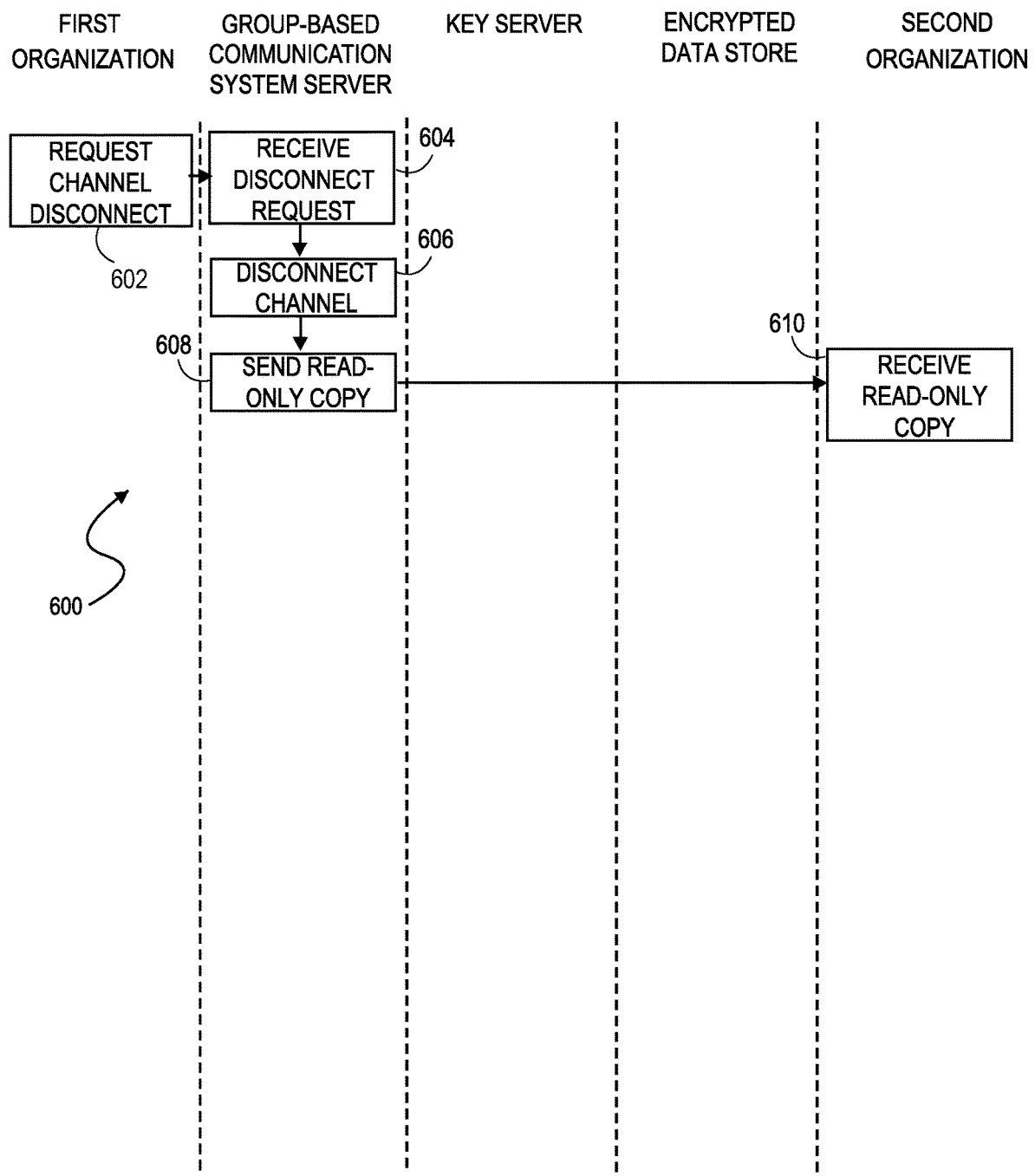

FIGS. 4A and 4B collectively depict a swim lane diagram illustrating the component responsibility flow of a process for displaying and encrypting a message within a channel for some embodiments of the invention;

FIGS. 5A and 5B collectively depict a swim lane diagram illustrating the component responsibility flow of a process for revoking access with a channel for some embodiments of the invention;

FIG. 6 depicts a swim lane diagram illustrating the component responsibility flow of a process for disconnecting a channel for some embodiments of the invention;

Figures 7A, 7B:
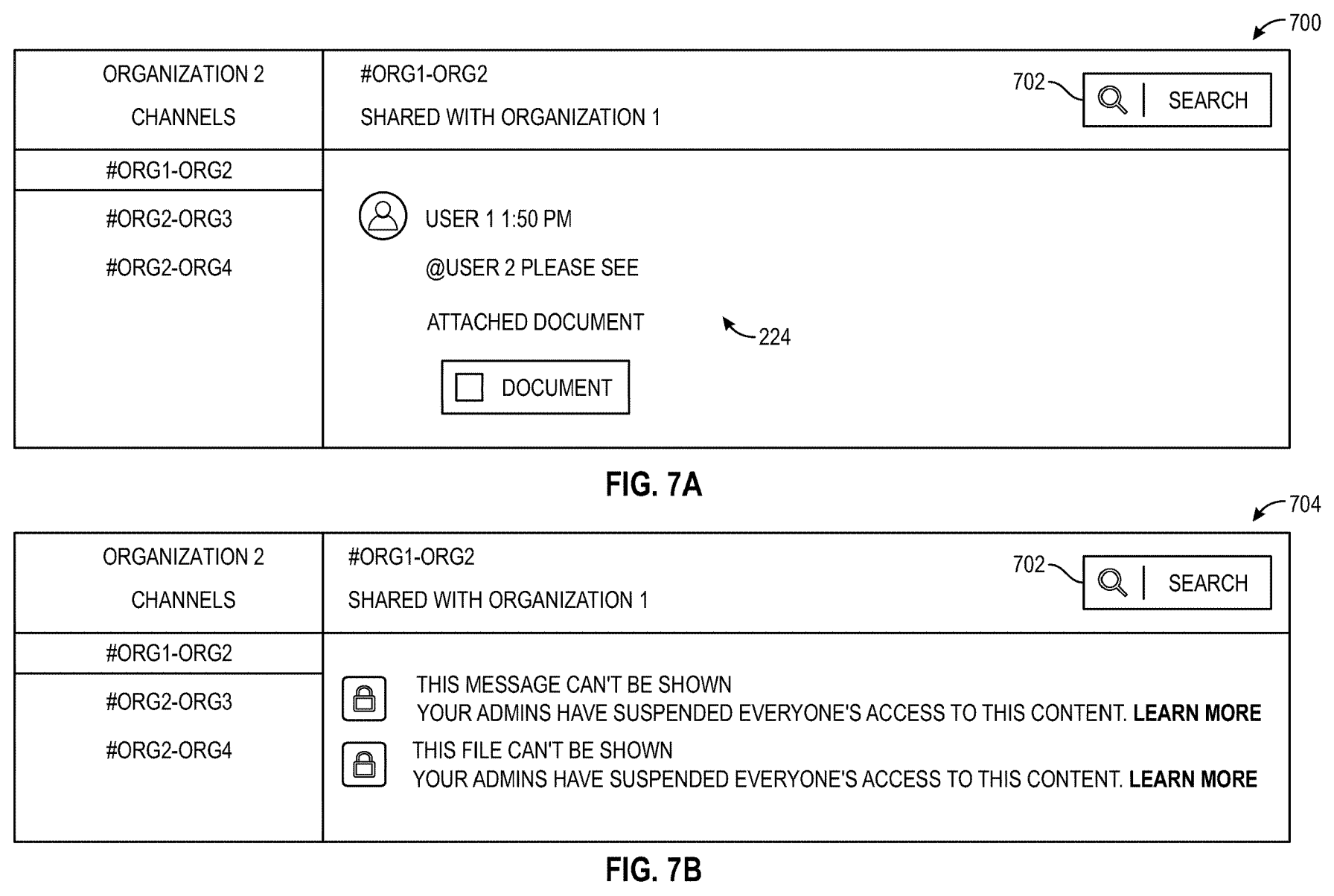

FIG. 7A depicts an exemplary screenshot of a decrypted message within a channel for some embodiments of the invention; and FIG. 7B depicts an exemplary screenshot of a message after key revocation within a channel for some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1A:
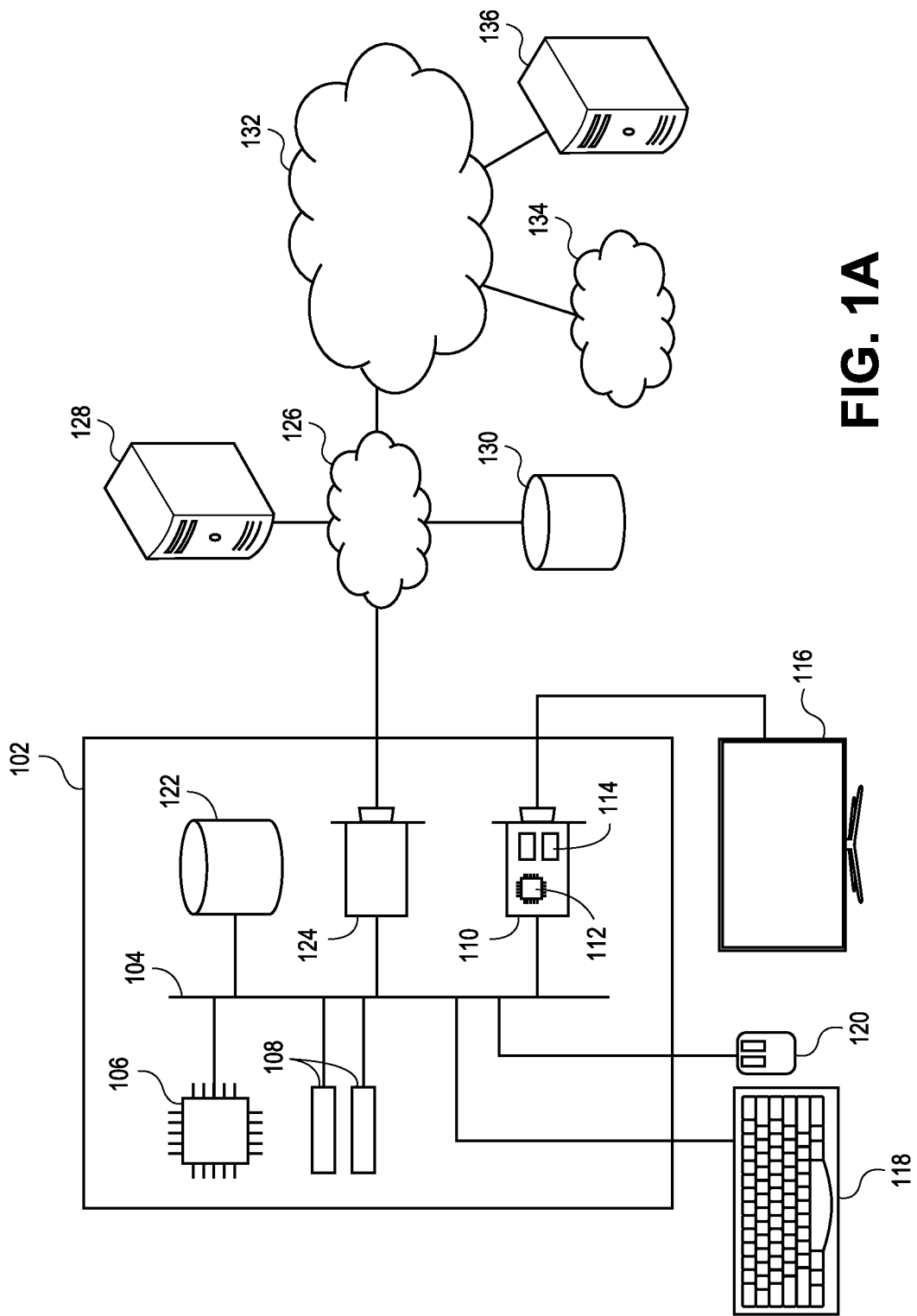
FIG. 1A depicts an exemplary hardware platform for certain embodiments of the invention.
Figure 1B:
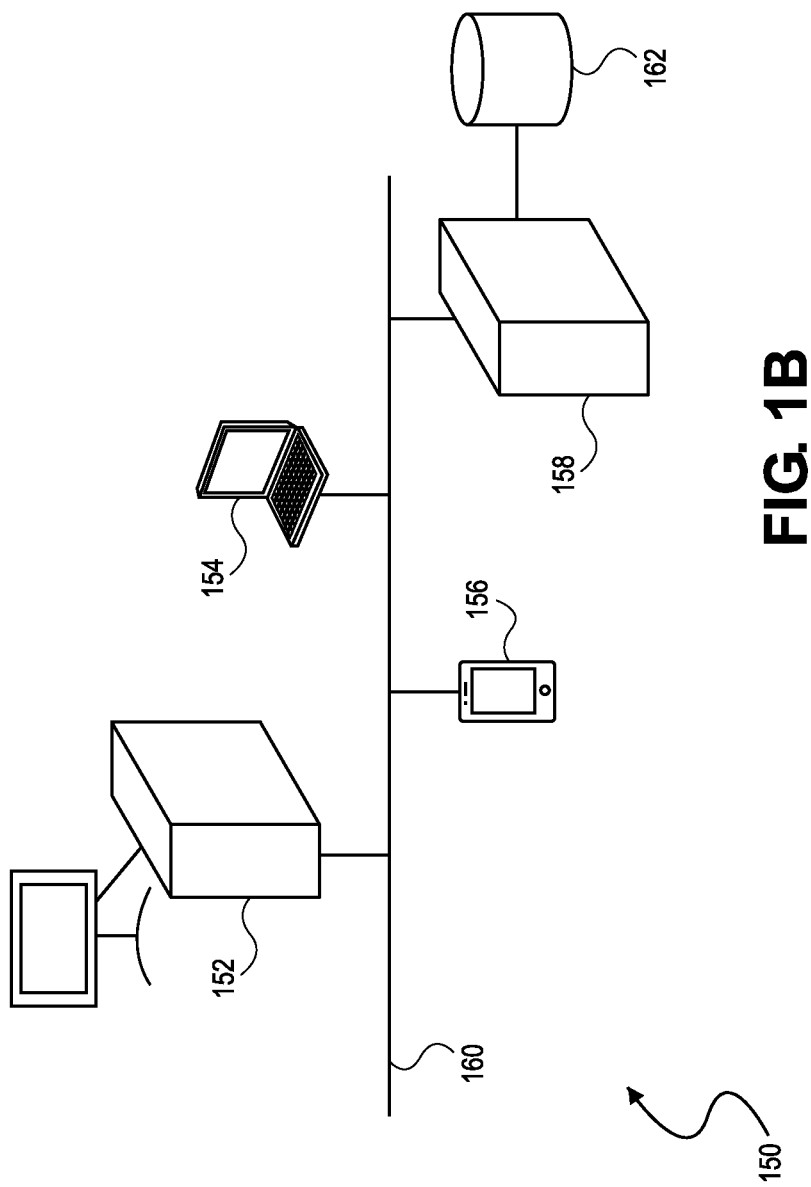
FIG. 1B depicts an exemplary diagram illustrating components of a system for carrying out embodiments of the invention.

Turning now to FIG. 1B, an exemplary network system 150 for carrying out embodiments of the invention is depicted. The network system 150 comprises any number of client devices, such as client device 152, client device 154, and client device 156. As depicted in FIG. 1B, client devices 152, 154, and 156 may be any of a desktop computer, a laptop computer, a mobile phone, a tablet, or any other device suitable to allow a user to access the group-based communication system. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to select users.

The system further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communications system hosted on the same server as a competitor's group-based communication system for security reasons. Group-based communication server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system is contemplated. Group-based communication system server 158 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. Wherein each user may be associated with a specific organization. An organization may be a small business, a corporation, a club, a shared-interest group, or any other group of users desiring to mutually communication. The group-based communication system is operable to provide communication services to any combination of users. For example, in some embodiments, communication services can be provided for a plurality of users from a single organization, as well as a plurality of users from a plurality of organizations. In some embodiments, a plurality of channels are present within the group-based communication system. Users may be added to each channel, such that users within the channel have access to messages and files displayed within the channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store 162. Alternatively or in addition, in any of these embodiments, data may be sharded across multiple group-based communication system data stores.

It should be understood that any of the client devices 152, 154, and 156, and the group-based communication system server 158 may comprise a processor, such as CPU 106 described with respect to FIG. 1A. Any of the functions described herein with respect to a processor may be carried out by the processors within any of these devices. In some embodiments, for example, a processor within the group-based communication system server 158 may perform a first function, while a processor within the client device performs a second function.

Figure 2A:
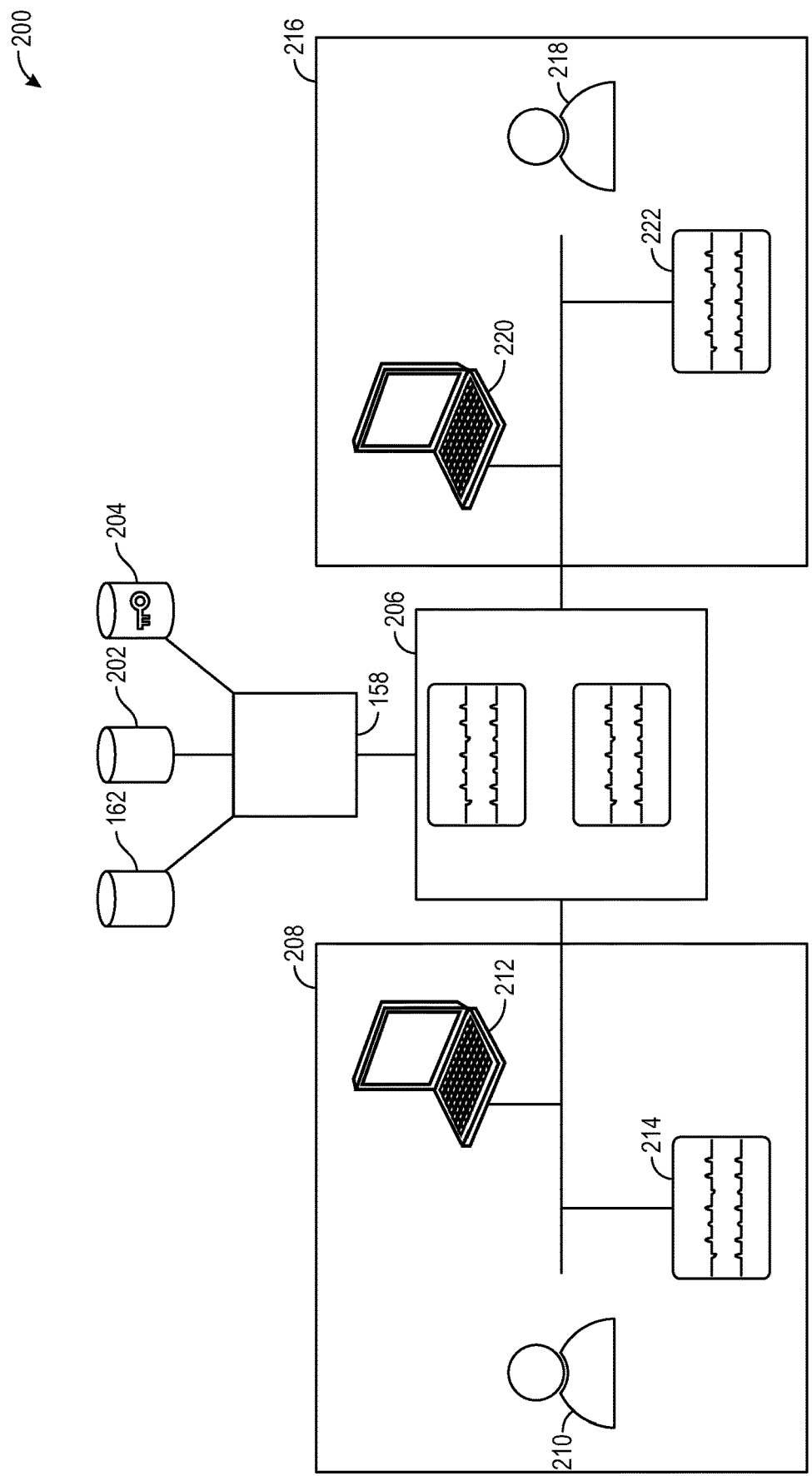
FIG. 2A depicts an exemplary encryption key management system of a channel for some embodiments of the invention.

Turning now to FIG. 2A, an exemplary encryption key management system 200 is depicted. In some embodiments, the encryption key management system 200 provides encryption key management to data communicated over a channel of the group-based communication system. The encryption key management system 200 comprises a group-based communication server 158 communicatively coupled to a group-based communication system data store 162, an encrypted data store 202, and a key server 204. The encrypted data store 202 stores a plurality of encrypted data structures comprising cyphertext, such as encrypted messages. The key server 204 provides encryption keys for encrypting plaintext into cyphertext and decryption keys for decrypting cyphertext into plaintext. In some embodiments, at least one of the encrypted data store 202 and the key server 204 may be part of the group-based communication system data store 162. Alternatively, in some embodiments, each of the group-based communication system data store 162, the encrypted data store 202, and the key server 204 are separate components.

As depicted, the group-based communication server provides a channel 206 of the group-based communication system. In some embodiments, the channel 206 is shared between a first organization 208 and a second organization 216, such that users from either of the first organization 208 and the second organization 216 can access the channel 206. Similarly, in some embodiments, the channel 206 may be shared between any combination of a plurality of users, a plurality of organizations, a guest user, and a plurality of guest users. The channel 206 may be accessed by a first user 210 via a first user device 212 and a second user 218 via a second user device 220. The first user device 212 and the second user device 220 may be any suitable user device for the users to interface with the group-based communication system, such as the user devices 152, 154, and 156 of FIG. 1B. In some embodiments, the first user device 212 and the second user device 220 are laptop computers, as shown. Further, in some embodiments, a plurality of users may access the channel 206 via a respective plurality of user devices. In some embodiments, the first user 210 belongs to the first organization 208 and the second user 218 belongs to the second organization 216, as shown.

The first user device 212 may be operated by the first user 210 to generate a first message 214 within the channel 206. Said first message 214 may be encrypted using an encryption key provided to the group-based communication system server 158 by the key server 204. After encryption the first message 214 is stored within the encrypted data store 202. With the appropriate decryption key provided by the key server 204, the first message 214 and other contents of the channel 206 may be accessed by the users of the channel 206. Here, the decryption key is used to decrypt cyphertext associated with the channel 206 into plaintext that comprises messages displayed within the channel 206.

Similarly, the second user device 220 may be operated by the second user 218 to generate a second message 222. Said second message 222 may be encrypted using an encryption key provided to the group-based communication system server 158 by the key server 204. After encryption the second message 222 is stored within the encrypted data store 202. With the appropriate decryption key provided by the key server 204, the first message 214, second message 222, and other contents of the channel 206 may be accessed by the users of the channel 206. Here, the decryption key is used to decrypt cyphertext associated with the channel 206 into plaintext that comprises messages displayed within the channel 206.

In some embodiments, the first message 214 may be encrypted according to an organization-specific encryption policy of the first organization 208, while the second message 222 is encrypted according to an organization-specific encryption policy of the second organization 216. Here, each organization controls the encryption policy of messages received from the users of the respective organization. It should be understood that the channel 206 is not limited to two organization but may include any number of organizations having their own encryption policies. For example, channel 206 may further include a third organization with its own encryption policy covering content received from users of the third organization.

In some embodiments, all user generated content may be encrypted, including messages, files, and reactions. In other embodiments, only messages may be encrypted. Further, in some embodiments, a user or administrator may select what specific content should be encrypted. For example, an administrator may select content to be encrypted to include messages and files displayed in the channel 206 but not reactions. In some such embodiments, the reactions may be saved in unencrypted form as plaintext with the encrypted messages. Alternatively, in some embodiments, reactions may be discarded after encryption, such that when the channel 206 is decrypted and displayed the reactions are no longer viewable. In some embodiments, the data that is encrypted is selected based on the encryption policy of the organization that owns the data. Here, the encryption policy determines what data should be encrypted and what encryption keys to use as well as when encryption keys should be rotated.

Rotation of encryption keys may be carried out according to an encryption policy, as described above. Here, encryption key rotation refers to replacing encryption keys with new keys. Encryption key rotation may be performed periodically based on an encryption policy of a specific organization and in some embodiments, encryption key rotation involves re-encrypting data in the encrypted data store 202 with new encryption keys received from key server 204, such that only the new encryption keys can be used to encrypt/decrypt data and the old encryption keys are no longer active. It may be desirable to rotate encryption keys periodically to increase data security and prevent active encryption keys from being stolen and used to access sensitive data. In some embodiments, it may be desirable to optimize the frequency that keys are rotated to enhance security while minimizing processing associated with rekeying. Accordingly, in some embodiments, keys may be rotated in response to a trigger, such as, for example disconnection of a channel, revocation of access, addition of a new user, or any other change in the channel or the group-based communication system.

In some embodiments, content of the channel 206 that is not encrypted includes content that is not owned by any user of the channel or by any organization, such as neutral content. For example, neutral content may include the channel name and user added notifications, as well as other system generated content. In some embodiments, the channel 206 may include a scheduling bot that posts generic reminders and notifications in the channel 206. Here, it may not be necessary to encrypt content received from the scheduling bot. Alternatively, in some embodiments, even system generated content may be encrypted.

Figure 2B:
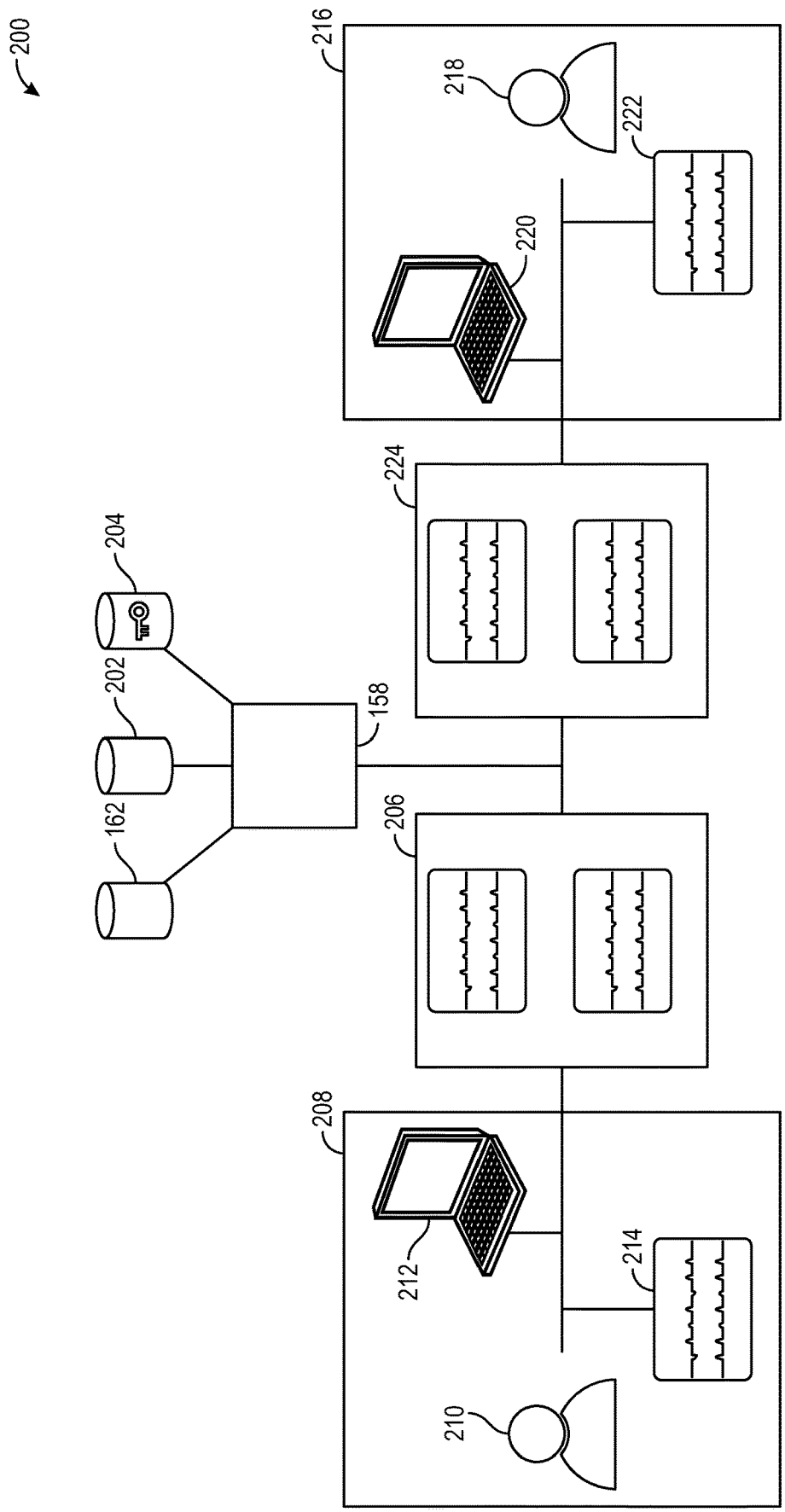
FIG. 2B depicts an exemplary encryption key management system of a disconnected channel for some embodiments of the invention.

Turning now to FIG. 2B, exemplary encryption key management system 200 is depicted with a disconnected channel. In some embodiments, the disconnected channel 224 may be a frozen read-only copy of the channel, such that content can no longer be added to the channel. For example, the first organization 208 may choose to disconnect the second organization 216 from the channel 206. Here, the first organization 208 may still have access to the active channel, while the second organization 216 has access to a disconnected (or "frozen") version of the channel 206. In some embodiments, both the channel 206 and the disconnected channel may be encrypted with the same encryption keys, such that if the first organization 208 revokes access of the channel 206 to the second organization 216, the second organization 216 will not be able to view the encrypted data on the disconnected channel.

It should be understood that, in some embodiments, revocation of access to content within the channel 206 may be handled granularly, such that an organization or an individual user may restrict access to one item at a time or to a portion of the content within the channel. For example, an administrator of the first organization 208 may choose to revoke access to a single message in a channel between the second organization 216. Alternatively, in some embodiments, revocation of access to an entire channel may be carried out according to a selection by an organization or a user. Further, in some embodiments, the organization may select to revoke access to a portion of the content or the entirety of the content within the channel 206 according to a user preference.

An exemplary use case for the encryption key management system 200 of FIGS. 2A-2B will now be described. In this exemplary case, the first organization 208 is in a business relationship with the second organization 216, where the users of each organization communicate over the channel 206 of the group-based communication system. For the sake of the example, the first organization is a technology company that creates software and the second organization is an animation company that provides the first organization with animation resources. It should be understood that the first organization and second organization may be any type of organization and in some embodiments, said organizations may consist of a single individual. In this example, first user 210 of first organization 208 communicates with second user 218 of second organization 216 by displaying the first message 214 in the channel 206. The first message 210 may include any of business related information, user information, a greeting, an attached file, etc.

For the sake of this example, the second organization 216 includes a malicious user who attempts to steal sensitive business-related information from the messages on the channel 206. Accordingly, after learning of the malicious user, an administrator of the first organization 208 decides to revoke access to all messages in the channel 206 that belong to the first organization 208. Accordingly, the malicious user, as well as other users of the second organization 216, such as second user 218, cannot access or view any message from the first organization 208 in the channel 206. Thus, the malicious user cannot steal sensitive information from the channel 206 because access to the encryption keys of the first organization 208 has been denied.

Figure 3:
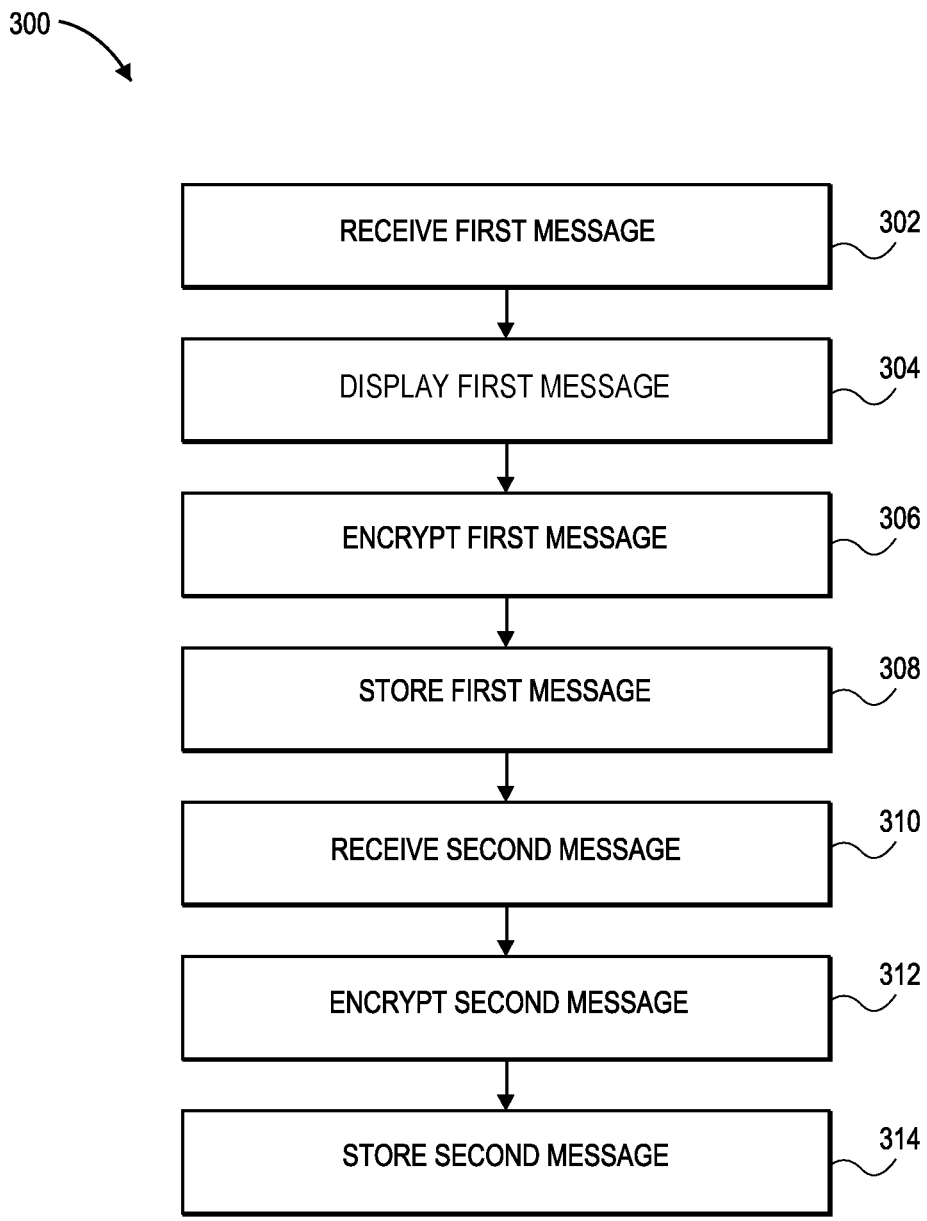
FIG. 3 depicts a method for providing encryption key management to a channel for some embodiments of the invention.

FIG. 3 depicts an exemplary method for providing encryption key management to the multi-organization channel 206 of the group-based communication system referred to generally by reference numeral 300. At step 302 the first message 214 is received. In some embodiments, the first message is generated by the first user 210 using the first user device 212. After receiving the first message 214, the first message 214 is displayed in the channel 206 at step 304. At step 306 the first message 214 is encrypted using an encryption key. In some embodiments, the first message 214 is encrypted according to the encryption policy of the first organization 208 using the first organization's encryption key. At step 308 the encrypted first message is stored. In some embodiments, the encrypted first message is stored on the encrypted data store 202. Alternatively, in some embodiments the encrypted first message may be stored on the group-based communication system data store 162 or on a server associated with the first organization. In some embodiments, the message is encrypted and stored prior to being displayed, and is retrieved and decrypted for display. One such embodiment is described below with respect to FIGS. 4A and 4B.

Next, at step 310, the second message 222 is received. In some embodiments, the second message 222 is generated by the second user 218 using the second user device 220. After receiving the second message 222, the second message 222 is displayed on the channel 206. As described above, in some embodiments, the message is encrypted and stored prior to being displayed. At step 312, the second message 222 is encrypted using an encryption key. In some embodiments, the second message 222 is encrypted according to the encryption policy of the second organization 216 using the second organization's encryption keys. Here, the encryption policy for each message is selected based on the encryption policy of the organization to which the author of the content belongs. Such a policy is referred to herein as the an "author aware encryption policy" or the "author-aware scope." It should be understood that the encryption policy may vary according to each respective organization's preferences. For example, the first organization may require strict encryption key management, where all messages are encrypted to protect sensitive data and encryption keys are rotated often. However, the second organization, for example, may have reduced or no encryption policy, where no messages are encrypted. Alternatively, in some embodiments, the second message may be encrypted according to the first organization's encryption policy even though the second user 218 who posted the message belongs to the second organization 216. In such embodiments, the encryption policy may be selected based on the ownership of the channel rather than the above-mentioned author-aware encryption policy. After encryption, the encrypted second message may be stored at step 314. In some embodiments, the encrypted second message is stored in the encrypted data store 202. It should be understood however, that the encrypted second message may be stored in any other suitable memory or storage environment, such as group-based communication system data store 162.

FIGS. 4A-4B, 5A-5B, and 6 show a swim lane diagrams illustrating the component responsibility flow of a plurality of exemplary processes for providing encryption key management to the channel 206. A first exemplary process for displaying and encrypting a message within the channel 206 is shown in FIGS. 4A-4B and is referred to generally by reference numeral 400. In the first exemplary process, the first organization 208 (or a user associated with the first organization) posts a message to the channel 206 of the group-based communication system at step 402. At step 404 the message is received by the group-based communication system server 158, which requests a key from the key server 204 at step 406. In some embodiments, the group-based communication server (or a dedicated encryption server for the group-based communication system) may cache recently used keys so that they need not be refetched from key server 204. Where the appropriate key is cached, steps 406-414 can be skipped and the appropriate key retrieved from the cache instead. The key server 204 receives the key request at step 408 and generates or retrieves a key at step 410, then sends key data associated with the generated key to the group-based communication system server 158 at step 412. At step 414, the group-based communication system server 158 receives the key data and encrypts the message at step 416 using the key data. After encrypting the message, the group-based communication system server 158 sends a storage request to the encrypted data store 202 at step 418. At step 420 the encrypted data store 202 receives the storage request and stores the encrypted message at step 422.

At step 424 the second organization 216 requests message data from the group-based communication system server 158. This may result, for example, from a user of the second organization accessing the channel or scrolling to access past messages in a channel. The group-based communication system server 158 receives the message request at step 426. Upon receiving the message request, the group-based communication system server 158 sends a request for encrypted message data to the encrypted data store 202 at step 428. The encrypted data store 202 receives the request for the encrypted message data at step 430 and retrieves the encrypted message data at step 432. Next, at step 434, the encrypted data store 202 sends the encrypted message data to the group-based communication system server 158. The group-based communication system server 158 receives the encrypted message data at step 436 and determines a key scope associated with the encrypted message data at step 438. After determining the key scope, the group-based communication system server 158 sends a key request to the key server 204 at step 440. At step 442 the key server 204 receives the key request and retrieves the key at step 444.

Next, at step 446 the key server 204 sends key data to the group-based communication system server 158, which receives the key data at step 448. After receiving the key data, which comprises a decryption key, the group-based communication system server 158 decrypts the encrypted message at step 450 using the key data. After decryption, the group-based communication system server 158 sends the decrypted message data to the second organization 216 at step 452. The second organization 216 receives the message data at step 454 and displays the message data at step 456, such that a user of the second organization 216 can view the message within the channel 206.

A second exemplary process for revoking access within the channel 206 is shown in FIGS. 5A and 5B and is referred to generally by reference numeral 500. At step 502, the first organization 208 submits a revocation request to the group-based communication system server 158. In some embodiments, the revocation request may be to revoke a single message within the channel 206. In other embodiments, the revocation request may be to revoke all messages belonging to the first organization 208 within the channel 206. In some embodiments, a user or administrator may select the scope of the revocation request. For example, a user may request the revocation of a certain portion of the messages in the channel 206 or all messages within the channel 206.

At step 504, the group-based communication system server 158 receives the revocation request and requests key revocation from the key server 204 at step 506. At step 508, the key server 204 receives the key revocation request and revokes key access at step 510. In some embodiments, revocation of key access may be completed for any combination of the first organization 208 and the second organization 216, as well as to a portion of a plurality of additional organizations within the channel 206. For example, the channel 206 includes 20 organizations, the first organization 208 may revoke key access to ten organizations but not to the remaining nine organizations. Further, in some embodiments, an administrator of the first organization 208 may choose to revoke key access to users within the first organization 208. In some embodiments, revocation of access revokes access to content within the channel 206 for all organizations within the channel 206. In some embodiments, key revocation may cause messages encrypted with the revoked key to be rekeyed (i.e., decrypted and re-encrypted with a new key, such that only the new key can be used to access the messages going forward).

At step 512 the second organization 216 requests a message from the group-based communication system server 158. For the sake of this example, the specific message is the message previously received from the first organization 208 in process 400, to which key access has been revoked. The group-based communication system server 158 receives the message request at step 514 and sends a request for the encrypted message to the encrypted data store 202 at step 516. At step 518, the decrypted data store receives the request for the encrypted message and retrieves the encrypted message data at step 520. At step 522, the encrypted data store 202 sends the encrypted message data to the group-based communication system server 158, which receives the encrypted message data at step 524 and determines a key scope at step 526.

Next, at step 528, the group-based communication system server 158 sends a key request based on the determined key scope to the key server 204. The key server 204 receives the key request at step 530 and denies the key request at step 532. Here, the key request is denied because the key has been revoked. At step 534 the key server 204 sends a key denied notification to the group-based communication system server 158, which receives the key denied notification at step 536 and sends an access denied notification to the second organization 216 at step 538. The second organization 216 receives the access denied notification at step 540 and displays an access denied message in the channel 206 at step 542. In some embodiments, the group-based communication server instead determines that the requesting user or requesting user's organization does not have access and generates the access denied notification directly, skipping steps 528-536.

Continuing the example situation mentioned above, the malicious user of the second organization 216 logs in to the group-based communication system and requests to view the channel 206. The malicious user wishes to extract sensitive information from the messages of the first organization 208 such as confidential business information of the first organization 208. However, because key access was revoked at step 510, the malicious user's request to view the messages will be denied and the malicious user will not be permitted to view any of the messages submitted by users of the first organization 208.

Turning now to FIG. 6, a third exemplary process for disconnecting a channel is depicted and is referred to generally as reference numeral 600. At step 602, the first organization 208 requests a channel disconnect. Here, the first organization 208 may select to disconnect the channel 206 from at least one other organization, such as the second organization 216. For example, in some embodiments, the channel may be disconnected from the second organization 216 while remaining connected between the first organization 208 and a third organization. At step 604 the group-based communication system server 158 receives the channel 206 disconnect request and disconnects the channel 206 at step 606. In some embodiments, a channel disconnect message may cause encrypted messages for the disconnected channel to be rekeyed, or duplicated and rekeyed for each organization. Upon disconnection of the channel 206, the group-based communication system server 158 sends a read-only copy of the channel 206 to the second organization 216 at step 608, which receives the read-only copy at step 610. In other embodiments, new messages in the channel are required to be encrypted with a new key (to which the disconnected organization does not have access), but old messages are left unchanged unless specifically revoked. In this way, the disconnected organization can continue to access messages posted in the channel prior to disconnection, but not access messages posted after disconnection or post new messages.

In some embodiments, upon disconnection of a channel, the administrator or host of the channel may be prompted to revoke access of the channel. Thus, the administrator will be reminded that the other organizations of the disconnected channel still receive access to the read-only copy where they can view content of the channel. Accordingly, the administrator may choose to also revoke access such that other organizations can no longer view content.

It should be understood that steps 502-542 may be carried out after step 610 to revoke access to content within the channel 206 even after the channel has been disconnected. For example, after disconnecting the channel 206, if the first organization 208 revokes access to content within the channel 206 access will be denied to the second organization 216 on the read-only copy of the disconnected channel.

It should be understood that, in some embodiments, a channel can be reconnected after being disconnected. During the channel 206 reconnection process, the read-only copy of the second organization 216 may be discarded and the second organization 216 receives the active version of the channel 206. Alternatively, the second organization may be granted access to the relevant keys upon reconnection, thus granting access to messages posted after disconnection and to post new messages. As yet another alternatively, reconnection may cause messages posted to the channel after reconnection to be posted using a third key to which the reconnected organization is granted access. In this way, the disconnected-and-reconnected organization can access messages posted in the channel before disconnection and after reconnection, but not messages posted while the organization was disconnected. Reconnection of a channel may be requested by a user or by an administrator. In some embodiments, disconnecting and reconnecting channels has no effect on data encryption and access revocation. For example, when a channel is reconnected, a message that was previously encrypted will remain encrypted and access to content that was previously revoked will not be granted.

Continuing the exemplary situation mentioned above, the first organization 208 wishes to discontinue the business relationship with the second organization 216 to avoid any interaction with the malicious user. As such, an administrator disconnects the second organization 216 from the channel 206. The process of disconnecting the channel 206 may be carried out according to the process 600, as shown in FIG. 6. Accordingly, the second organization 216 will receive (or otherwise be granted access to) a disconnected read-only copy of the channel 224 and will still be unable to view messages to which access has been revoked. After disconnecting the channel 206 the first organization 208 may find a new organization to work with, that provides the required business resources which the second organization 216 had previously provided. Accordingly, the first organization 208 may decide to add the new organization to the channel 206 or to create a new channel between the first organization 208 and the new organization.

FIG. 7A shows an exemplary screenshot 700 of the channel 206, as viewed by the second user 218, where the first message 214 is submitted by the first user 210 of the first organization 208 and is viewable by the second user 218 of the second organization 216. Here, the message may have been encrypted, stored in the encrypted data store 202, retrieved and unencrypted, before being displayed on the second user device 220 of the second user 218. In some embodiments, the first message 214 is encrypted according to the encryption policy of the first organization 208. The exemplary screenshot 700 shows a message from the first user 210 in the channel 206. In some embodiments, the message is the first message 214. In some embodiments, the first message 214 may be accompanied by a document, as shown. With the appropriate encryption keys the first message 214 may be viewed and the document may be viewed and downloaded. The exemplary screenshot 700 further depicts a search function 702 for searching text displayed within the channel 206. In some embodiments, the search function 702 searches within search indexes for plaintext. In some embodiments, the search index is associated with the channel 206.

FIG. 7B shows an exemplary screenshot 704 of the channel 206 where the first organization 208 has revoked access to a message within the channel 206, such that an access denied message is displayed. In some embodiments, the access denied message may read "The author has suspended access to this content." Alternatively, in some embodiments, based on the specific situation the access denied message may read "An administrator has suspended access to this content" or "An organization has suspended access to this content." It should be understood that the specific text displayed on the access denied message may vary and in some embodiments, may be selected based on the specific situation. For example, if an administrator revokes access, then the access denied message may reflect this. Alternatively, in some embodiments, a general access denied message may be displayed such that the specific user that revoked access is unknown. In some embodiments, the access denied message may read "This message can't be shown: Your admins have suspended everyone's access to this content. Learn more", as shown. In some embodiments, the phrase "learn more" may include a clickable link that can direct a user to more information about the access denied message. For example, by clicking the "learn more" link, the user may be directed to a page that describes that the encryption policy has denied access to the message based on an action by an administrator of an organization within the channel 206. In some embodiments, the access denied message may also recite "This file can't be shown", as shown, where access to a file within the channel 206 has also been revoked. It should be understood that the access denied message may include a variety of suitable text, and in some embodiments, the text may be selected based on the specific circumstances of the content in the channel 206.

The search function 702 is also depicted in exemplary screenshot 704. Here, after access has been revoked, the search function 702 may be unable to search text from messages that has been revoked. In some embodiments, text may be filtered out of the search index during a search if access has been revoked. In other embodiments, text is automatically removed from the search index upon revocation of access.

In some embodiments, encryption key management is carried out on the channel 206 according to an encryption policy, which may be an organization specific encryption policy. In some such embodiments, encryption key management may operate according to an "author-aware" scope, where the encryption key management is set according to the encryption policy of the author and the organization to which the author belongs. Accordingly, if a user of a first organization 208 submits a message in a channel, the message will be encrypted according to the encryption policy of the first organization 208 using the first organization's keys.

Alternatively, in some embodiments, encryption key management is carried out on the channel 206 according to an encryption policy of the channel host or channel creator, known as and referred to hereinafter as the host-control scope. In such embodiments, any content is encrypted according to the encryption policy of the channel host regardless of what user submitted the content. For example, if the first user 210 of the first organization 208 is the channel host and creates a channel, any content submitted by the first user 210 and the second user 218 will be encrypted according to the first organization's encryption policy. Here, even if the second user 218 (belonging to the second organization 216) submits a message, that message will be encrypted according to the first organization's encryption policy, even if the second organization 216 has its own encryption policy.

Additionally, in some embodiments, an encryption key scope may be selected using unique identifiers that are specific to the channel 206, referred to hereinafter as the unique scope. Here, a unique identifier may be generated when a channel is shared. Further, in some embodiments, a current-channel scope may be used. Here, a current channel identification of the current channel is used to determine the key scope, such as when to rekey and what keys to use. When using the current-channel scope, messages are rekeyed according to the author upon disconnect of a channel.

It should be understood that, in some embodiments, multiple encryption key management scopes may be used. Further, in some embodiments, a single organization may use varying encryption scopes between different channels. For example, the author-aware scope may be used on some channels of the first organization and the host-control scope described above may be used on another channel, where all content is encrypted according to the first organization's encryption policy. In some such embodiments, an administrator may select to override the author-aware scope on a channel 206 with the host-control scope by submitting an override request, such that all content is encrypted according to the host organization's encryption policy. In some embodiments, this override technique may be applied by adjusting a parameter in the settings of the channel. Further, in some embodiments, the specific encryption scopes used in a given channel are selected by the host when the channel is created, while in other embodiments, the encryption scope may be adjusted at any time. For example, an administrator of the first organization may submit an override request in a pre-existing channel where the second user 218 has already submitted the second message 222, which was encrypted with the second organization's encryption keys. Upon receiving the override request from the administrator, the scope may be changed from the author-aware scope to the host-control scope, where the second message 222 along with other content within the channel is re-encrypted with the first organizations encryption keys.

It should be understood that in some embodiments, either of the first user 210 and the second user 218 may be administrators of their respective organizations. For example, the first user 210 may be an administrator of the first organization 208 and the second user 218 may be an administrator of the second organization 216. Alternatively, in some embodiments neither of the first user 210 and the second user 218 are administrators and each organization has its own administrator or administrators. Additionally, in some embodiments, it may be desirable to include a non-human, computer-based administrator, such as a computer program, which may act on behalf of a human administrator or a user. The computer program may perform any of the actions described herein with respect to an administrator. For example, the computer program may automatically request revocation of encryption keys at step 502 (based on factors such as, for example, the passage of time). In some embodiments, the computer program detects malicious activity and revokes access based on this detection. Here, the computer program may comprise or interact with a machine learning algorithm that is trained to identify malicious users and malicious activity within the channel 206 of the group-based communication system. Thus, access can be revoked automatically before a malicious user can view sensitive data.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method implemented by a computing device of a communication system comprising:
    receiving, from a first device of a first organization, a message associated with a channel of the communication system, wherein the channel is a group-based communication channel associated with two or more organizations, and wherein the channel enables members to communicate with one another via posting communications to the channel;
    encrypting, based at least in part on a determination that a sender of the message is associated with the first organization of the two or more organizations, the message based at least in part on a first encryption policy associated with the first organization, wherein the first encryption policy is different than a second encryption policy associated with a second organization of the two or more organizations;
    retrieving, by a second device of the second organization, the encrypted message from a data store associated with the channel;
    decrypting the encrypted message prior to causing the message to be presented, in the channel, via a user interface associated with the communication system; and
    causing display on the second device, the decrypted message in the channel via the user interface associated with the communication system.

2. The method of claim 1, wherein the message is from a first user account associated with the first organization, and wherein the user interface is a first user interface, the method further comprising:

receiving, from the first device associated with the first organization, a first request to revoke access of a second user account associated with the second organization to the message;

in response to receiving the first request to revoke access to the message, causing an encryption key associated with the first encryption policy to be revoked with respect to the second user account and in association with the message; and based at least in part on a revocation of the encryption key, withholding contents associated with the message from presentation via a second user interface associated with the second user account.

3. The method of claim 2, further comprising:

receiving, from the second user account, a third request to access data associated with the channel;

in response to receiving the third request to access data, sending, to a computing device associated with a key server, a fourth request for the encryption key, the fourth request comprising an identification of the second user account; and receiving, from the computing device associated with the key server, an indication of the revocation of the encryption key in association with the message, wherein the contents associated with the message are withheld from presentation based at least in part on the indication of the revocation of the encryption key.

4. The method of claim 3, further comprising:

causing presentation, via the second user interface, of a notification indicating that access to the message is denied.

5. The method of claim 2, wherein the first request to revoke access comprises at least one of:

a first indication of the message to be withheld from presentation;

a second indication of a group of message to be withheld from presentation; or a third indication that messages posted in association with one or more first user accounts associated with the first organization are to be withheld from presentation.

6. The method of claim 1, wherein the message is from a first user account from among first user accounts associated with the first organization, the method further comprising:

receiving, from the first device associated with the first organization, a fifth request to revoke access of second user accounts associated with the second organization to first messages transmitted in association with the channel, the first messages being posted in association with the first user accounts associated with the first organization;

identifying the first messages associated with the channel that are posted in association with the first user accounts; and withholding contents associated with the first messages from presentation via user interfaces associated with the second user accounts, wherein the user interfaces comprise second messages transmitted in association with the channel and posted in association with the second user accounts.

7. The method of claim 1, further comprising:

receiving a second message from a second user account associated with the second organization, for posting in association with the channel;

identifying, based at least in part on an ownership of the channel, at least one of the first encryption policy or the second encryption policy to apply to the second message; and encrypting the second message based on the at least one of the first encryption policy or the second encryption policy.

8. The method of claim 1, wherein the message is encrypted at a first time with a first encryption key associated with the first encryption policy, the method further comprising:

determining, at a second time after the first time, to apply a second encryption key to communications transmitted via the channel and posted in association with first user accounts of the first organization;

re-encrypting the message utilizing the second encryption key; and storing the second encryption key in association with the first organization and the channel.

9. The method of claim 8, wherein a determination to apply a second encryption key is based on at least one of:

a triggering event associated with the channel; or an interval for modifying encryption keys that is associated with the first encryption policy.

10. One or more non-transitory computer-readable media storing computer-executable instructions that, when executed by one or more processors, perform operations for providing encryption key management to a channel within a communication system, the operations comprising the steps of:

receiving, from a first device of a first organization, a message associated with the channel of the communication system, wherein the channel is a group-based communication channel associated with two or more organizations, and wherein the channel enables members to communicate with one another via posting communications to the channel;

encrypting, based at least in part on a determination that a sender of the message is associated with the first organization of the two or more organizations, the message based at least in part on a first encryption policy associated with the first organization, wherein the first encryption policy is different than a second encryption policy associated with a second organization of the two or more organizations;

retrieving, by a second device of the second organization, the encrypted message from a data store associated with the channel;

decrypting the encrypted message prior to causing the message to be presented, in the channel, via a user interface associated with the communication system; and causing display on the second device, the decrypted message in the channel via the user interface associated with the communication system.

11. The one or more non-transitory computer-readable media of claim 10, wherein the message is from a first user account associated with the first organization, and wherein the user interface is a first user interface, the operations further comprising:

receiving, from the first device associated with the first organization, a first request to revoke access of a second user account associated with the second organization to the message;

in response to receiving the first request to revoke access to the message, causing an encryption key associated with the first encryption policy to be revoked with respect to the second user account and in association with the message; and based at least in part on a revocation of the encryption key, withholding contents associated with the message from presentation via a second user interface associated with the second user account.

12. The one or more non-transitory computer-readable media of claim 11, the operations further comprising:
   receiving, from the second user account, a third request to access data associated with the channel;
   in response to receiving the third request to access data, sending, to a computing device associated with a key server, a fourth request for the encryption key, the fourth request comprising an identification of the second user account; and
   receiving, from the computing device associated with the key server, an indication of the revocation of the encryption key in association with the message,
   wherein the contents associated with the message are withheld from presentation based at least in part on the indication of the revocation of the encryption key.

13. The one or more non-transitory computer-readable media of claim 11, wherein the first request to revoke access comprises at least one of:
   a first indication of the message to be withheld from presentation;
   a second indication of a group of message to be withheld from presentation; or
   a third indication that messages posted in association with one or more first user accounts associated with the first organization are to be withheld from presentation.

14. The one or more non-transitory computer-readable media of claim 10, wherein the message is from a first user account from among first user accounts associated with the first organization, the operations further comprising:
   receiving, from the first device associated with the first organization, a fifth request to revoke access of second user accounts associated with the second organization to first messages transmitted in association with the channel, the first messages being posted in association with the first user accounts associated with the first organization;
   identifying the first messages associated with the channel that are posted in association with the first user accounts; and
   withholding contents associated with the first messages from presentation via user interfaces associated with the second user accounts, wherein the user interfaces comprise second messages transmitted in association with the channel and posted in association with the second user accounts.

15. The one or more non-transitory computer-readable media of claim 10, the operations further comprising:
   receiving a second message from a second user account associated with the second organization, for posting in association with the channel;
   identifying, based at least in part on an ownership of the channel, at least one of the first encryption policy or the second encryption policy to apply to the second message; and
   encrypting the second message based on the at least one of the first encryption policy or the second encryption policy.

16. The one or more non-transitory computer-readable media of claim 10, wherein the message is encrypted at a first time with a first encryption key associated with the first encryption policy, the operations further comprising:
   determining, at a second time after the first time, to apply a second encryption key to communications transmitted via the channel and posted in association with first user accounts of the first organization;
   re-encrypting the message utilizing the second encryption key; and
   storing the second encryption key in association with the first organization and the channel.

17. A system for providing encryption key management to a channel within a communication system, the system comprising:
   one or more processors; and
   one or more non-transitory computer readable media storing computer executable instructions that, when executed, cause the one or more processors to perform operations comprising:
      receiving, from a first device of a first organization, a message associated with the channel of the communication system, wherein the channel is a group-based communication channel associated with two or more organizations, and wherein the channel enables members to communicate with one another via posting communications to the channel;
      encrypting, based at least in part on a determination that a sender of the message is associated with the first organization of the two or more organizations, the message based at least in part on a first encryption policy associated with the first organization, wherein the first encryption policy is different than a second encryption policy associated with a second organization of the two or more organizations;
      retrieving, by a second device of the second organization, the encrypted message from a data store associated with the channel;
      decrypting the encrypted message prior to causing the message to be presented, in the channel, via a user interface associated with the communication system; and
      causing display on the second device, the decrypted message in the channel via the user interface associated with the communication system.

18. The system of claim 17, wherein the message is from a first user account associated with the first organization, and wherein the user interface is a first user interface, the operations further comprising:
   receiving, from the first device associated with the first organization, a first request to revoke access of a second user account associated with the second organization to the message;
   in response to receiving the first request to revoke access to the message, causing an encryption key associated with the first encryption policy to be revoked with respect to the second user account and in association with the message; and
   based at least in part on a revocation of the encryption key, withholding contents associated with the message from presentation via a second user interface associated with the second user account.

19. The system of claim 18, the operations further comprising:
   receiving, from the second user account, a third request to access data associated with the channel;
   in response to receiving the third request to access data, sending, to a computing device associated with a key server, a fourth request for the encryption key, the fourth request comprising an identification of the second user account; and receiving, from the computing device associated with the key server, an indication of the revocation of the encryption key in association with the message, wherein the contents associated with the message are withheld from presentation based at least in part on the indication of the revocation of the encryption key.

20. The system of claim 18, wherein the first request to revoke access comprises at least one of:
- a first indication of the message to be withheld from presentation;
- a second indication of a group of message to be withheld from presentation; or
- a third indication that messages posted in association with one or more first user accounts associated with the first organization are to be withheld from presentation.

* * * * *